US012762827B2

(12) United States Patent
Ravi Kumar et al.

(10) Patent No.: US 12,762,827 B2
(45) Date of Patent: Oct. 13, 2026

(54) SEMANTIC GUIDED SCENE FLOW ESTIMATION

(71) Applicant: QUALCOMM Incorporated, San Diego, CA (US)

(72) Inventors: Varun Ravi Kumar, San Diego, CA (US); Jun Wang, Novi, MI (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 18/609,469

(22) Filed: Mar. 19, 2024

(65) Prior Publication Data

US 2025/0299464 A1 Sep. 25, 2025

(51) Int. Cl.

| | |
|---|---|
| ***G06V 10/44*** | (2022.01) |
| ***G01S 17/89*** | (2020.01) |
| ***G06T 7/20*** | (2017.01) |
| ***G06T 7/60*** | (2017.01) |
| ***G06V 10/80*** | (2022.01) |

(52) U.S. Cl.

CPC .............. *G06V 10/44* (2022.01); *G01S 17/89* (2013.01); *G06T 7/20* (2013.01); *G06T 7/60* (2013.01); *G06V 10/806* (2022.01)

(58) Field of Classification Search

CPC ...... G06V 10/44; G06V 10/806; G06V 10/82; G06V 20/56; G06V 20/64; G01S 17/89; G01S 17/931; G06T 7/20; G06T 7/60; G06T 7/269; G06T 2207/10016; G06T 2207/10024; G06T 2207/10028; G06T 2207/20081; G06T 2207/20084; G06T 2207/30252

See application file for complete search history.

(56) References Cited

U.S. PATENT DOCUMENTS

| | | | | |
|---|---|---|---|---|
| 2021/0358137 | A1* | 11/2021 | Lee ......................... | G06T 7/246 |
| 2023/0394306 | A1* | 12/2023 | Piergiovanni ........ | G06N 3/0442 |
| 2024/0144487 | A1* | 5/2024 | Abbeloos ............... | G06V 10/44 |
| 2025/0157055 | A1* | 5/2025 | Peng .................. | G06V 10/7715 |

FOREIGN PATENT DOCUMENTS

| | | | | |
|---|---|---|---|---|
| DE | 102022208714 | A1 * | 2/2024 | ............. G06V 10/82 |

* cited by examiner

*Primary Examiner* — John B Strege

(74) *Attorney, Agent, or Firm* — Shumaker & Sieffert, P. A.

(57) ABSTRACT

A method for scene flow estimation includes receiving multimodal data having at least a first modality and a second modality, wherein the multimodal data represents a plurality of points in a scene. The method also includes extracting a first set of features from the first modality and extracting a second set of features from the second modality; and projecting the first set of features and the second set of features into a shared latent space to generate a first latent representation. Additionally, the method includes estimating a flow of the plurality of points of the scene based on one or more relationships between the first set of features and the second set of features by using a model trained to learn the one or more relationships between the first set of features and the second set of features based on the first latent representation and the second latent representation.

21 Claims, 5 Drawing Sheets

SEMANTIC GUIDED SCENE FLOW ESTIMATION

TECHNICAL FIELD

This disclosure relates to image processing.

BACKGROUND

Scene flow estimation may be used for understanding how objects and elements move in three-dimensional (3D) space over time. Scene flow estimation may be used in autonomous navigation, robotics, and other 3D scene understanding tasks. Existing scene flow estimation methods can be categorized into single-modality and multi-modality approaches. Single-modality methods use either Light Detection And Ranging (LiDAR) point clouds or two-dimensional (2D) images alone. LiDAR-based methods provide high precision for object shapes and distances, but less texture detail. Image-based methods provide rich texture information, but less accurate depth estimation.

SUMMARY

This disclosure describes techniques for incorporating semantic information into scene flow estimation. More specifically, deep learning techniques may be used to extract semantic features from both LiDAR and images. Incorporated semantic information may guide matching and flow estimation with object-level understanding.

In an aspect, the techniques disclosed herein address sensor-specific noise and inconsistencies.

Semantic-aware techniques may also provide enhanced ability to track and predict object movements. These techniques may help to develop better understanding of scenes with multiple interacting objects.

The disclosed techniques incorporate semantic understanding to improve the accuracy and robustness of scene flow estimation, especially in complex scenes. The disclosed techniques may achieve this by leveraging semantic information from 2D images to guide the estimation process in 3D point clouds. As yet another non-limiting advantage, the disclosed techniques employ 2D image semantic segmentation models to generate dense semantic labels for each pixel in the image.

In one example, a method for scene flow estimation includes receiving multimodal data having at least a first modality and a second modality, wherein the multimodal data represents a plurality of points in a scene; and extracting a first set of features from the first modality and extracting a second set of features from the second modality. The method also includes projecting the first set of features and the second set of features into a shared latent space to generate a first latent representation of the first set of features and a second latent representation of the second set of features. The method further includes estimating flow of the plurality of points of the scene based on one or more relationships between the first set of features and the second set of features by using a model trained to learn the one or more relationships between the first set of features and the second set of features based on the first latent representation and the second latent representation.

In another example, an apparatus for scene flow estimation includes a memory for storing multimodal data; and processing circuitry in communication with the memory. The processing circuitry is configured to receive the multimodal data having at least a first modality and a second modality, wherein the multimodal data represents a plurality of points in a scene. The processing circuitry is also configured extract a first set of features from the first modality and extract a second set of features from the second modality. Additionally, the processing circuitry is configured to project the first set of features and the second set of features into a shared latent space to generate a first latent representation of the first set of features and a second latent representation of the second set of features. Finally, the processing circuitry is configured to estimate a flow of the plurality of points of the scene based on one or more relationships between the first set of features and the second set of features by using a model trained to learn the one or more relationships between the first set of features and the second set of features based on the first latent representation and the second latent representation.

In yet another example, a computer-readable medium includes instructions that, when applied by processing circuitry, cause the processing circuitry to: receive the multimodal data having at least a first modality and a second modality, wherein the multimodal data represents a plurality of points in a scene. Additionally, the instructions cause the processing circuitry to extract a first set of features from the first modality and extract a second set of features from the second modality; project the first set of features and the second set of features into a shared latent space to generate a first latent representation of the first set of features and a second latent representation of the second set of features; and estimate a flow of the plurality of points of the scene based on one or more relationships between the first set of features and the second set of features by using a model trained to learn the one or more relationships between the first set of features and the second set of features based on the first latent representation and the second latent representation.

The details of one or more examples are set forth in the accompanying drawings and the description below. Other features, objects, and advantages will be apparent from the description, drawings, and claims.

Figure 1:
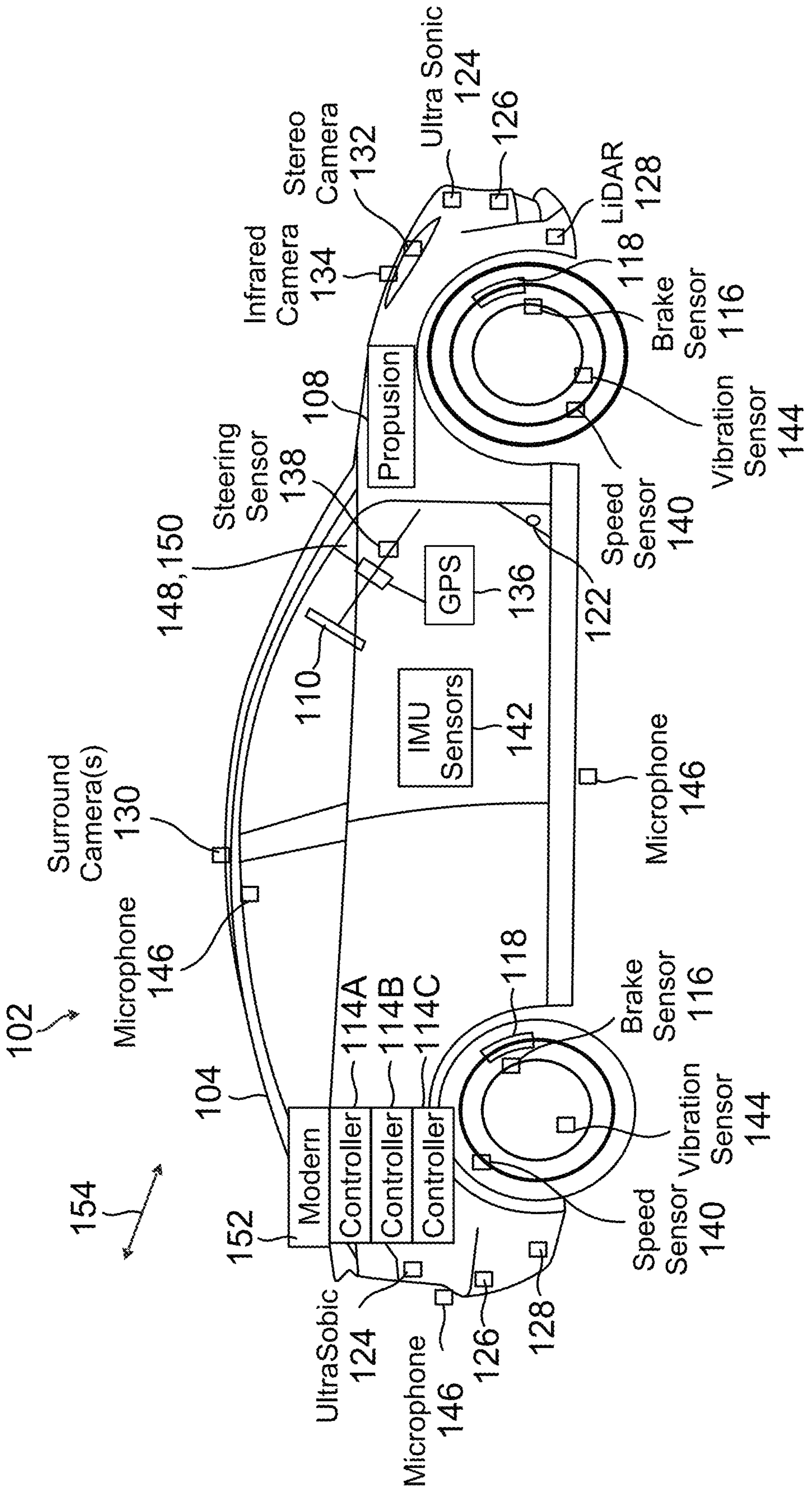
FIG. 1 is a diagram of an example autonomous vehicle, in accordance with the techniques of this disclosure.

DETAILED DESCRIPTION 3D motion estimation is a fundamental challenge in computer vision with important real-world applications. For example, in autonomous vehicles, accurately predicting the future 3D movements of other objects is important for safe navigation. 3D scene flow estimation aims to determine the motion trajectories of individual points in a scene across multiple frames, essentially predicting their paths over time. 3D scene flow estimation is a challenging task due to various factors like, but not limited to: occlusion, lack of texture/features, and complexity of real-world scenes. Occlusion occurs when parts of objects are being hidden from view.

Some surfaces may not have enough distinctive markings for accurate tracking. Dynamic environments with numerous moving objects may add difficulty.

Multi-modality methods combine LiDAR and images to leverage their complementary strengths. Multi-modality methods aim to achieve more robust and accurate scene flow estimation. However, existing multi-modality methods focus on low level matching without semantic understanding. In general, existing multi-modality methods rely on matching individual points or patches without understanding their semantic meaning (e.g., "car," "pedestrian," etc.). Focusing on low-level matching may lead to errors in complex scenes with occlusions, similar appearances, or objects moving independently. Lack of semantic context may miss higher-level relationships between objects and their movements. Context could help resolve ambiguities and improve correspondence estimation In an aspect, 2D image semantic segmentation models may be used to analyze the input images and generate dense semantic labels. The dense semantic labels may provide information about the objects and surfaces present in the scene. Semantic context may be transferred from the labeled 2D images to the 3D point cloud representation of the scene. Such transfer enriches the point cloud data with semantic information.

By incorporating semantic context, the techniques described in this disclosure may improve scene flow estimation accuracy in several ways. Semantic information may help distinguish between different objects and surfaces, leading to more accurate matching and flow prediction. The disclosed techniques may leverage the knowledge of object dynamics and interactions to better understand the scene motion. Semantic guidance makes scene flow estimation more robust to occlusions, noise, and other challenges.

Sparse point clouds often lack sufficient context for accurate flow prediction. Image-based semantic segmentation, however, may analyze a wider area and capture broader contextual information about the scene. This larger "receptive field" allows the disclosed machine learning system to understand the relationships between different objects and surfaces, which may be important for estimating their motion accurately. By appending semantic labels to raw points, the machine learning system may gain additional guidance for scene flow estimation. The semantic labels tell the model what each point belongs to (e.g., car, pedestrian, road) and point's potential motion patterns. Such information may facilitate more accurate matching and flow prediction, especially for intricate scenes with overlapping objects.

Semantic labels may also be used to filter out background clutter. Points belonging to irrelevant objects or static areas may be de-emphasized or disregarded, simplifying the task of finding corresponding points and estimating their motion. Reduced clutter may reduce the influence of noise and irrelevant details, leading to cleaner and more accurate flow estimates. The overall goal is to leverage the strengths of both images and point clouds to achieve better multi-modal scene flow estimation, especially in complex and cluttered scenes.

FIG. 1 shows an example autonomous vehicle 102. Autonomous vehicle 102 in the example shown may comprise a passenger vehicle such as a car or truck that can accommodate a human driver and/or human passengers. In an aspect, autonomous vehicle 102 may comprise an ADAS system. Autonomous vehicle 102 may include a vehicle body 104 suspended on a chassis, in this example comprised of four wheels and associated axles. A propulsion system 108 such as an internal combustion engine, hybrid electric power plant, or even all-electric engine may be connected to drive some or all of the wheels via a drive train, which may include a transmission (not shown). A steering wheel 110 may be used to steer some or all of the wheels to direct autonomous vehicle 102 along a desired path when the propulsion system 108 is operating and engaged to propel the autonomous vehicle 102. Steering wheel 110 or the like may be optional for Level 5 implementations. One or more controllers 114A-114C (a controller 114) may provide autonomous capabilities in response to signals continuously provided in real-time from an array of sensors, as described more fully below.

Each controller 114 may be essentially one or more onboard computers that may be configured to perform deep learning and artificial intelligence functionality and output autonomous operation commands to self-drive autonomous vehicle 102 and/or assist the human vehicle driver in driving. Each vehicle may have any number of distinct controllers for functional safety and additional features. For example, controller 114A may serve as the primary computer for autonomous driving functions, controller 114B may serve as a secondary computer for functional safety functions, controller 114C may provide artificial intelligence functionality for in-camera sensors, and controller 114 (D (not shown) may provide infotainment functionality and provide additional redundancy for emergency situations.

Controller 114 may send command signals to operate vehicle brakes 116 via one or more braking actuators 118, operate steering mechanism via a steering actuator, and operate propulsion system 108 which also receives an accelerator/throttle actuation signal 122. Actuation may be performed by methods known to persons of ordinary skill in the art, with signals typically sent via the Controller Area Network data interface ("CAN bus")—a network inside modern cars used to control brakes, acceleration, steering, windshield wipers, and the like. The CAN bus may be configured to have dozens of nodes, each with its own unique identifier (CAN ID). The bus may be read to find steering wheel angle, ground speed, engine RPM, button positions, and other vehicle status indicators. The functional safety level for a CAN bus interface is typically Automotive Safety Integrity Level (ASIL) B. Other protocols may be used for communicating within a vehicle, including FlexRay and Ethernet.

In an aspect, an actuation controller may be obtained with dedicated hardware and software, allowing control of throttle, brake, steering, and shifting. The hardware may provide a bridge between the vehicle's CAN bus and the controller 114, forwarding vehicle data to controller 114 including the turn signal, wheel speed, acceleration, pitch, roll, yaw, Global Positioning System ("GPS") data, tire pressure, fuel level, sonar, brake torque, and others. Similar actuation controllers may be configured for any other make and type of vehicle, including special-purpose patrol and security cars, robo-taxis, long-haul trucks including tractor-trailer configurations, tiller trucks, agricultural vehicles, industrial vehicles, and buses.

Controller 114 may provide autonomous driving outputs in response to an array of sensor inputs including, for example: one or more ultrasonic sensors 124, one or more RADAR sensors 126, one or more LIDAR sensors 128, one or more surround cameras 130 (typically such cameras are located at various places on vehicle body 104 to image areas all around the vehicle body), one or more stereo cameras 132 (in an aspect, at least one such stereo camera may face forward to provide object recognition in the vehicle path), one or more infrared cameras 134, GPS unit 136 that provides location coordinates, a steering sensor 138 that detects the steering angle, speed sensors 140 (one for each of the wheels), an inertial sensor or inertial measurement unit ("IMU") 142 that monitors movement of vehicle body 104 (this sensor can be for example an accelerometer(s) and/or a gyro-sensor(s) and/or a magnetic compass(es)), tire vibration sensors 144, and microphones 146 placed around and inside the vehicle. Other sensors may be used, as is known to persons of ordinary skill in the art.

Controller 114 may also receive inputs from an instrument cluster 148 and may provide human-perceptible outputs to a human operator via human-machine interface ("HMI") display(s) 150, an audible annunciator, a loudspeaker and/or other means. In addition to traditional information such as velocity, time, and other well-known information, HMI display 150 may provide the vehicle occupants with information regarding maps and vehicle's location, the location of other vehicles (including an occupancy grid) and even the Controller's identification of objects and status. For example, HMI display 150 may alert the passenger when the controller has identified the presence of a stop sign, caution sign, or changing traffic light and is taking appropriate action, giving the vehicle occupants peace of mind that the controller 114 is functioning as intended.

In an aspect, instrument cluster 148 may include a separate controller/processor configured to perform deep learning and artificial intelligence functionality.

Autonomous vehicle 102 may collect data that is preferably used to help train and refine the neural networks used for autonomous driving. The autonomous vehicle 102 may include modem 152, preferably a system-on-a-chip that provides modulation and demodulation functionality and allows the controller 114 to communicate over the wireless network 154. Modem 152 may include an RF front-end for up-conversion from baseband to RF, and down-conversion from RF to baseband, as is known in the art. Frequency conversion may be achieved either through known direct-conversion processes (direct from baseband to RF and vice-versa) or through super-heterodyne processes, as is known in the art. Alternatively, such RF front-end functionality may be provided by a separate chip. Modem 152 preferably includes wireless functionality substantially compliant with one or more wireless protocols such as, without limitation: LTE, WCDMA, UMTS, GSM, CDMA2000, or other known and widely used wireless protocols.

It should be noted that, compared to sonar and RADAR sensors 126, cameras 130-134 may generate a richer set of features at a fraction of the cost. Thus, autonomous vehicle 102 may include a plurality of cameras 130-134, capturing images around the entire periphery of the autonomous vehicle 102. Camera type and lens selection depends on the nature and type of function. The autonomous vehicle 102 may have a mix of camera types and lenses to provide complete coverage around the autonomous vehicle 102; in general, narrow lenses do not have a wide field of view but can see farther. All camera locations on the autonomous vehicle 102 may support interfaces such as Gigabit Multimedia Serial link (GMSL) and Gigabit Ethernet.

In an aspect, a controller 114 may receive multimodal data having at least a first modality (e.g., image data) and a second modality (e.g., LiDAR point cloud data). The multimodal data represents a plurality of points in a scene. Next, controller 114 may extract a first set of features (e.g., semantic priors) from the first modality and extracting a second set of features (e.g., geometric features) from the second modality. Controller 114 may then project the first set of features and the second set of features into a shared latent space to generate first latent representation of the first set of features and second latent representation of the second set of features. In addition, controller 114 may learn one or more relationships between the first set of features and the second set of features based on the first latent representation and the second latent representation. Next, controller 114 may estimate a flow of the plurality of points of the scene based on the learned one or more relationships between the first set of features and the second set of features.

Figure 2:
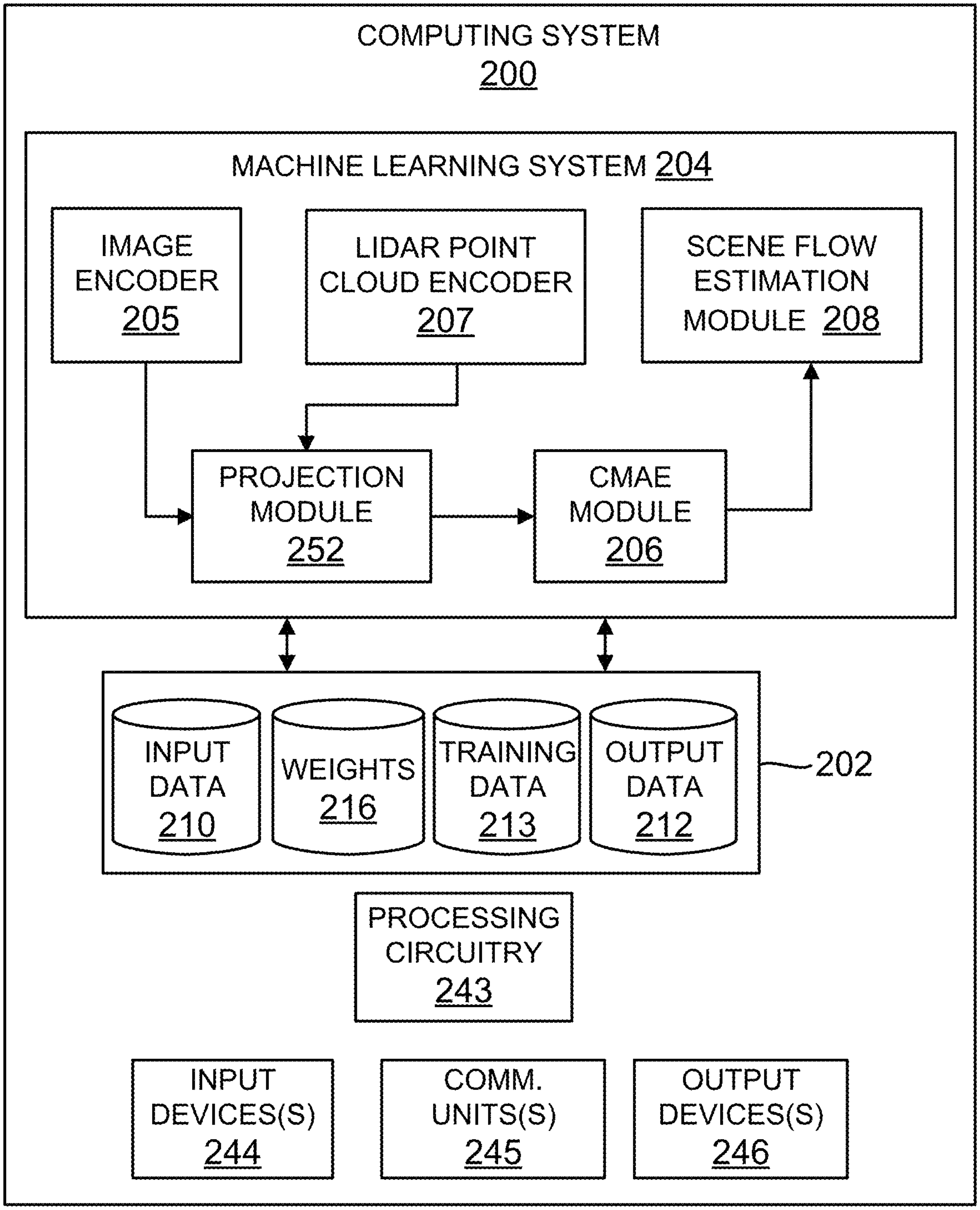
FIG. 2 is a block diagram illustrating an example system that may perform the techniques of this disclosure.

FIG. 2 is a block diagram illustrating an example computing system 200. As shown, computing system 200 comprises processing circuitry 243 and memory 202 for executing a machine learning system 204, which may represent an example instance of any controller 114 described in this disclosure, such as controller 114 of FIG. 1. In an aspect, machine learning system 204 may include, but is not limited to Cross-Modal Attention Embedding (CMAE) module 206, image encoder 205, LiDAR point cloud encoder 207, scene flow estimation module 208 and projection module 252.

Computing system 200 may also be implemented as any suitable external computing system accessible by controller 114, such as one or more server computers, workstations, laptops, mainframes, appliances, cloud computing systems, High-Performance Computing (HPC) systems (i.e., supercomputing) and/or other computing systems that may be capable of performing operations and/or functions described in accordance with one or more aspects of the present disclosure. In some examples, computing system 200 may represent a cloud computing system, server farm, and/or server cluster (or portion thereof) that provides services to client devices and other devices or systems. In other examples, computing system 200 may represent or be implemented through one or more virtualized compute instances (e.g., virtual machines, containers, etc.) of a data center, cloud computing system, server farm, and/or server cluster.

The techniques described in this disclosure may be implemented, at least in part, in hardware, software, firmware or any combination thereof. For example, various aspects of the described techniques may be implemented within processing circuitry 243 of computing system 200, which may include one or more of a microprocessor, a controller, a digital signal processor (DSP), an application specific integrated circuit (ASIC), a field-programmable gate array (FPGA), or equivalent discrete or integrated logic circuitry, or other types of processing circuitry. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

In another example, computing system 200 comprises any suitable computing system having one or more computing devices, such as desktop computers, laptop computers, gaming consoles, smart televisions, handheld devices, tablets, mobile telephones, smartphones, etc. In some examples, at least a portion of computing system 200 is distributed across a cloud computing system, a data center, or across a network, such as the Internet, another public or private communications network, for instance, broadband, cellular, Wi-Fi, ZigBee, Bluetooth® (or other personal area network—PAN), Near-Field Communication (NFC), ultrawideband, satellite, enterprise, service provider and/or other types of communication networks, for transmitting data between computing systems, servers, and computing devices.

Memory 202 may comprise one or more storage devices. One or more components of computing system 200 (e.g., processing circuitry 243, memory 202, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. Processing circuitry 243 of computing system 200 may implement functionality and/or execute instructions associated with computing system 200. Examples of processing circuitry 243 include microprocessors, application processors, display controllers, auxiliary processors, one or more sensor hubs, and any other hardware configured to function as a processor, a processing unit, or a processing device. Computing system 200 may use processing circuitry 243 to perform operations in accordance with one or more aspects of the present disclosure using software, hardware, firmware, or a mixture of hardware, software, and firmware residing in and/or executing at computing system 200. The one or more storage devices of memory 202 may be distributed among multiple devices.

Memory 202 may store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 202, in some examples, may also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 202 may store program instructions and/or data associated with one or more of the modules described in accordance with one or more aspects of this disclosure.

Processing circuitry 243 and memory 202 may provide an operating environment or platform for one or more modules or units (e.g., CMAE module 206, image encoder 205, LiDAR point cloud encoder 207, scene flow estimation module 208 and projection module 252), which may be implemented as software, but may in some examples include any combination of hardware, firmware, and software. Processing circuitry 243 may execute instructions and the one or more storage devices, e.g., memory 202, may store instructions and/or data of one or more modules. The combination of processing circuitry 243 and memory 202 may retrieve, store, and/or execute the instructions and/or data of one or more applications, modules, or software. The processing circuitry 243 and/or memory 202 may also be operably coupled to one or more other software and/or hardware components, including, but not limited to, one or more of the components illustrated in FIG. 2.

Processing circuitry 243 may execute machine learning system 204 using virtualization modules, such as a virtual machine or container executing on underlying hardware. One or more of such modules may execute as one or more services of an operating system or computing platform. Aspects of machine learning system 204 may execute as one or more executable programs at an application layer of a computing platform.

One or more input devices 244 of computing system 200 may generate, receive, or process input. Such input may include input from a video camera, sensor, keyboard, pointing device, voice responsive system, biometric detection/response system, button, mobile device, control pad, microphone, presence-sensitive screen, network, or any other type of device for detecting input from a human or machine.

One or more output devices 246 may generate, transmit, or process output. Examples of output are tactile, audio, visual, and/or video output. Output devices 246 may include a display, sound card, video graphics adapter card, speaker, presence-sensitive screen, one or more USB interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 244 and one or more output devices 246.

One or more communication units 245 of computing system 200 may communicate with devices external to computing system 200 (or among separate computing devices of computing system 200) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 include a network interface card (e.g., such as an Ethernet card), an optical transceiver, a radio frequency transceiver, a GPS receiver, or any other type of device that can send and/or receive information. Other examples of communication units 245 may include Bluetooth®, GPS, 3G, 4G, and Wi-Fi® radios found in mobile devices as well as Universal Serial Bus (USB) controllers and the like.

In the example of FIG. 2, one or more feature extractors may receive input data 210 and scene flow attention head may generate output data 212. Processed output data 212 generated by CMAE module 206 may be used as input data for a scene flow estimation head (shown in FIGS. 3A and 3B) of the machine learning system 204. Input data 210 and output data 212 may contain various types of information. For example, input data 210 may include, but is not limited to, image data, LiDAR data, and so on. Output data 212 generated by CMAE module 206 may include fused multi-modal features that combine semantic and geometric cues.

Machine learning system 204 may comprise a pre-trained model that is trained using training data 213, in accordance with techniques described herein.

In an aspect, 2D semantic segmentation as context introduces the concept of semantic priors, providing additional information to aid 3D motion estimation. 2D semantic segmentation models may analyze images and assign class labels like “person,” “car,” or “road” to each pixel. Knowing the class of each object helps to predict its likely movements based on typical motion patterns. Semantic labels may distinguish relevant objects from static background elements, reducing noise and simplifying motion tracking.

Occlusion happens when objects partially hide each other, making point correspondence across frames difficult. Semantic labels provide class-based information, so even if part of an object is hidden, object's identity (e.g., "car") helps link points across frames and predict object's complete motion trajectory. In scenes with low texture or featureless surfaces, traditional methods based solely on geometry or appearance struggle to track points accurately. Semantic labels provide additional context about object class, which may offer valuable cues for point matching and motion prediction even in the absence of strong visual features. Complex scenes with numerous objects and background elements may create a cluttered point cloud, making it hard to identify and track individual objects. Semantic labeling helps to group points based on class, simplifying the scene by distinguishing relevant objects from irrelevant background clutter. Such focused analysis may lead to more accurate and efficient motion estimation for individual objects.

In an aspect, the surface of a 3D object may be defined by a set of coordinates in a local coordinate system. Local coordinate system is a 3D grid attached to the object itself, with its own origin (0, 0, 0) and axes (X, Y, Z) that define directions within the object's space. The precise 3D positions of points on the object's surface may be defined using this local coordinate system. Each point has three values (x, y, z), representing pont's distance along the X, Y, and Z axes relative to the origin.

By specifying the aforementioned object coordinates, machine learning system 204 may create a digital map of the object's surface, enabling computational modeling and analysis of object's 3D geometry. Object coordinates may capture the exact shape and form of the object in a way that computer models can understand and manipulate.

Object coordinates may enable various computational tasks, such as, but not limited to: distance and angle calculations, surface rendering, shape deformation and animation, object recognition and tracking. Object coordinates may be used to measure distances between points, angles between surfaces, and other geometric relationships. Object coordinates may be used to create visual representations of the object's shape. Object coordinates may also be used for manipulating the object's geometry for design, simulation, or animation purposes. Furthermore, object coordinates may be used for identifying and tracking objects in 3D scenes using their geometric features. As yet another non-limiting example, object coordinates may be used for guiding the precise creation of physical objects using 3D printing or other fabrication techniques. In summary, object coordinates may provide a powerful framework for representing and analyzing 3D objects in computational environments.

Coordinate values may encode the exact distances and angles between points on the object, enabling precise calculations and measurements. Coordinate values may allow reasoning about the object's shape, orientation, and layout within the 3D space. Detailed geometric understanding, such as being able to measure the exact curve of a car fender or calculating the precise angle between two limbs on a robot, may be important for many tasks. The geometric understanding gained from object coordinates may assist with numerous tasks in computer vision and robotics, including, but not limited to: 3D reconstruction, pose estimation, object recognition, spatial perception. Object coordinates may be used for building a complete 3D model of an object from multiple viewpoints or data sources. The precise position and orientation of an object in 3D space may also be determined using object coordinates. Object coordinates may be used for identifying and classifying objects based on their 3D shapes and features. A comprehensive understanding of the 3D environment surrounding autonomous vehicle 102 may be created using object coordinates. In the context of scene flow estimation, object coordinates may provide valuable 3D structural cues about the scene. Determining the precise positions and relationships between points on different objects may help track objects' movements and estimate their future trajectories. Such detailed understanding of the scene dynamics may be important for accurate scene flow prediction.

Points belonging to the same semantic class (e.g., all points on a car, all points on the road) tend to move together in a coordinated fashion, even if their individual visual features might vary. Semantic priors may act as constraints or guidelines to steer the scene flow estimation towards more realistic and consistent solutions. Semantic priors may help ensure that points belonging to the same object move together, even in challenging scenarios with occlusions, noise, or ambiguous features.

Semantic information may offer a broader understanding of the scene beyond just individual points and their spatial relationships. Semantic information may provide insight into object identities, object's typical motion patterns, and object's interactions with other objects and the environment. Semantic priors may help model scenes more realistically and accurately, leading to better motion predictions. Semantic information may provide context about the scene, which may be important for handling complex and dynamic scenarios. Semantic priors, extracted from 2D images, may complement 3D geometry and may significantly boost scene flow estimation. Semantic priors may offer a higher-level understanding of the scene, guiding more robust and accurate motion prediction.

Integration of semantic context and 3D geometry may be important for tackling real-world challenges and building robust scene flow models. In an aspect, accurately predicting the future movements of objects in a scene may be important for safe navigation of autonomous vehicles. In an aspect, understanding scene dynamics may be important for robots to interact with their environments intelligently. Analyzing motion patterns in videos has applications in surveillance, sports analysis, and more.

In an aspect, point clouds from LiDAR may provide accurate 3D spatial information about the scene, capturing the positions and shapes of objects.

In an aspect, corresponding images may offer rich visual information, including, but not limited to, texture, color, and semantic context. In an aspect, separate encoder networks 205-207 may be used to extract meaningful features from each modality. In an aspect, LiDAR point cloud encoder 207 may extract geometric features that describe the 3D structure of the scene.

In an aspect, image encoder 205 may extract visual features that capture object appearances and textures. Machine learning system 204 may perform semantic segmentation on the image to assign semantic labels (e.g., "car," "person," "road") to each pixel.

In an aspect, semantic segmentation may provide semantic context about the scene, which may be important for guiding the scene flow estimation process. In an aspect, CMAE module 206 plays a central role in fusing information from both modalities. Accordingly, CMAE module 206 may project the extracted features from LiDAR and images into a shared latent space. CMAE module 206 may enable cross-modal attention, allowing each modality to focus on relevant information from the other. CMAE module 206 effectively integrates semantic context from images with geometric features from LiDAR. The integrated features in the shared latent space may then used for subsequent tasks, such as scene flow estimation performed by scene flow estimation module 208 or other 3D scene understanding tasks. Examples of the specific tasks may depend on the intended application.

Semantic guidance incorporates semantic information to improve scene flow estimation and other tasks. In an aspect, cross-modal attention may enable each modality to learn from the other, enhancing feature representation. Shared latent space may facilitate multi-modal learning and may enable the machine learning system 204 to reason about both geometric and visual cues.

Each encoder (LiDAR point cloud encoder 207 and image encoder 205) may attend to its own features, highlighting important elements within each modality.

In an aspect, CMAE module 206 may transform features from both modalities into a shared latent space, enabling meaningful interactions between them.

Each modality may attend to relevant parts of the other, allowing the modalities to learn from each other and create enhanced representations. Scene flow estimation module 208 may generate a graph, such as Graph Neural Network (GNN), where nodes represent 3D points, and edges connect neighboring points. Each node's embedding may capture its fused attended features received from the CMAE module 206, containing both geometric and semantic information.

In an aspect, the generated GNN may iteratively propagate information between neighboring nodes, allowing each point to learn from its local context. For example, both semantic and geometric cues, encapsulated in the fused representations, may be effectively spread across the graph through message passing. CMAE module 206 may enable rich interactions between LiDAR and image features, leading to more comprehensive scene understanding. GNN may excel at capturing relationships and patterns within structured data like point clouds. Semantic information from images may guide geometric reasoning and point flow prediction. More specifically, the combination of CMAE module 206 and GNN may result in multi-modal, context-aware point embeddings.

Figure 3A:
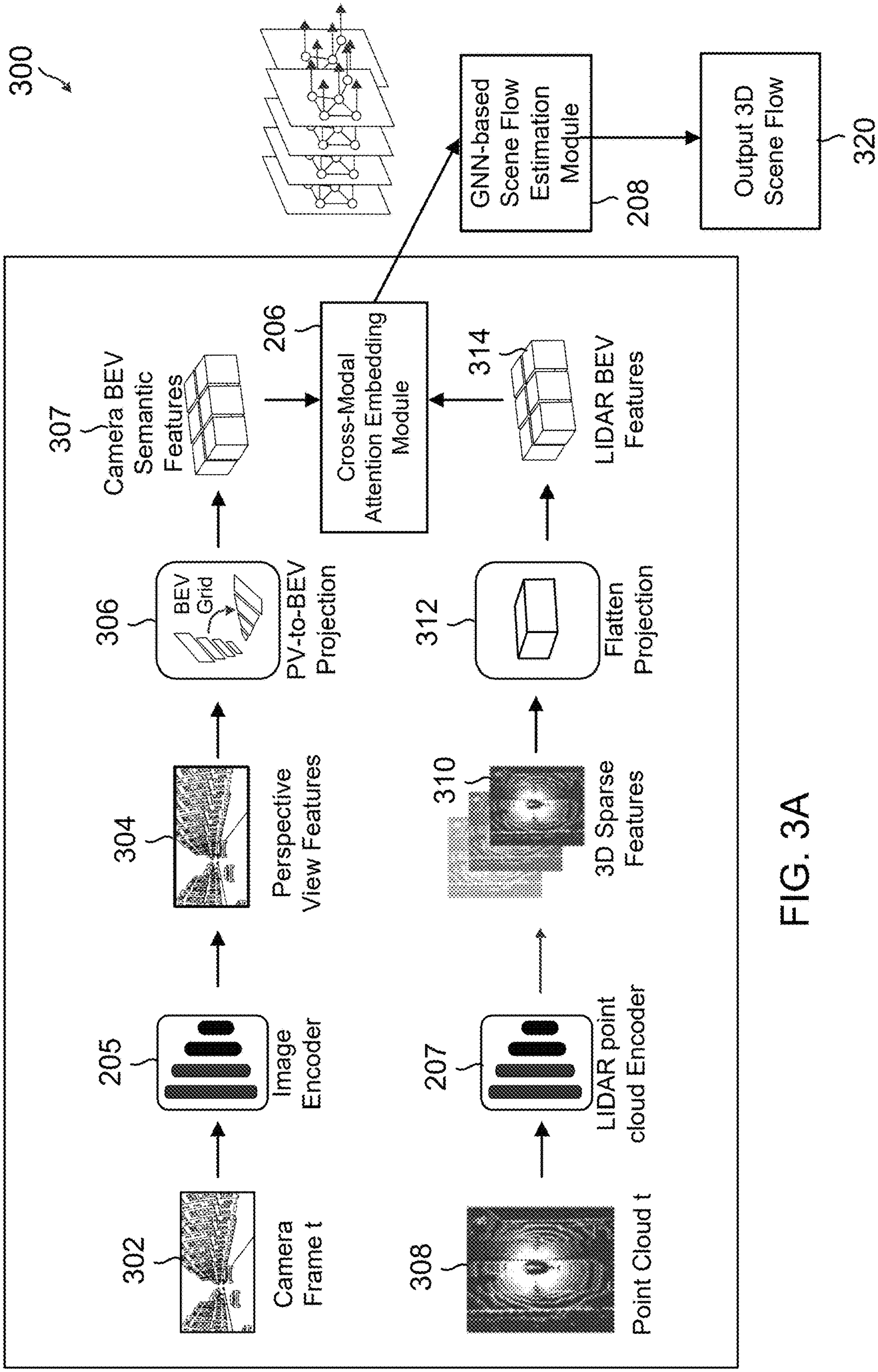
FIGS. 3A and 3B are diagrams illustrating an example AI-based autonomous driving system framework for scene flow estimation that may perform the techniques of this disclosure.
Figure 3B:
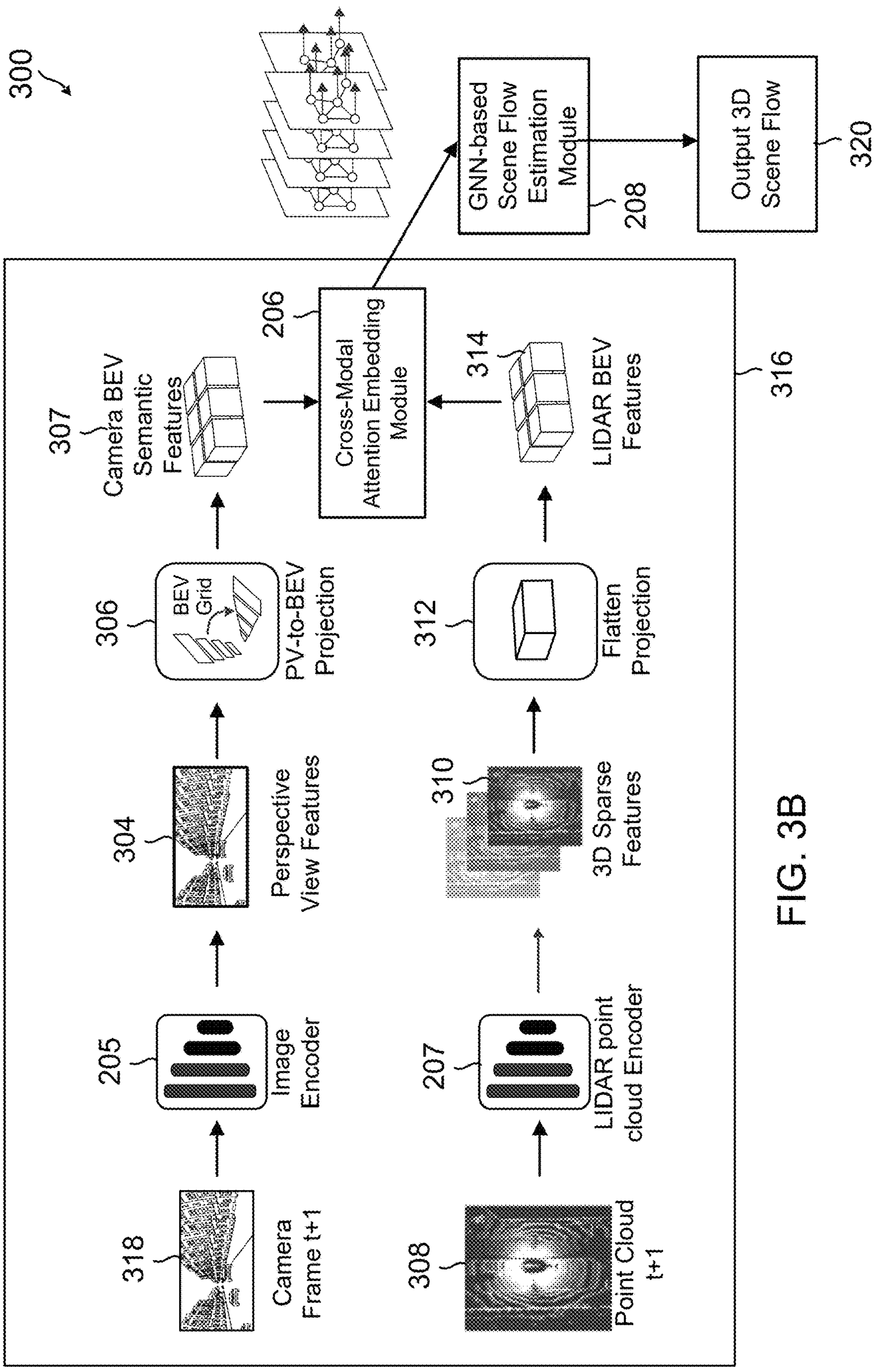

FIGS. 3A and 3B are diagrams illustrating an example AI-based framework 300 for scene flow estimation that may perform the techniques of this disclosure. In an aspect, scene flow estimation may be used to determine velocity of an object associated with a 3D scene. FIGS. 3A and 3B are provided for purposes of explanation and should not be considered limiting of the techniques as broadly exemplified and described in this disclosure. For purposes of explanation, this disclosure describes framework 300 illustrated in FIGS. 3A and 3B that may be configured to perform scene flow estimation based on fused multi-modal features provided by CMAE module 206.

In an aspect, image encoder 205 may receive camera frame (image 302) at time t as input. The image encoder 205, which may be implemented as CNN (Convolutional Neural Network), for example, may process the image to extract meaningful visual features. In an aspect, as shown in FIG. 3A, the image encoder 205 may output perspective view features, representing visual information from the camera's perspective. Projection module 252 may perform Perspective View (PV) to Birds Eye View (BEV) projection. Projection module 252 may use perspective view features 304 as input. Projection module 252 may project 306 the perspective view features 304 from the camera's perspective onto a 2D Birds Eye View (BEV) grid, aligning them with the LiDAR data. In an aspect, Projection module 252 may output camera BEV semantic features 307, forming a semantic-aware representation of the scene from a top-down perspective.

In an aspect, LiDAR point cloud encoder 207 may receive point cloud (3D spatial data) at time t 308 as input. The LiDAR point cloud encoder 207 may process the point cloud to extract geometric features. The LiDAR point cloud encoder 207 may output 3D sparse features 310 capturing the 3D structure of the scene, which, in turn, may be used as input into projection module 252. The projection module 252 may project 3D features onto the same BEV grid as the camera features, ensuring spatial alignment. In an aspect, the projection module 252 may output LiDAR BEV features 314, representing geometric information in the BEV format. CMAE module 206 may use camera BEV semantic features 307 and LiDAR BEV features 314 as input.

The CMAE module 206 may align and fuse information from both modalities, enabling them to learn from each other.

In an aspect, CMAE module 206 may generate fused multi-modal features that combine semantic and geometric cues.

In an aspect, steps described above with respect to FIG. 3A may also be performed 316 to process next frame acquired at time instance t+1 318, as shown in FIG. 3B. In an aspect, fused multi-modal features from the CMAE module 206 may be used as input into the scene flow estimation module 208. The scene flow estimation module 208 may operate on a graph, like GNN, representing the BEV grid, with nodes containing the fused features. The scene flow estimation module 208 may output 3D scene flow 320, predicting the motion trajectories of points in the scene between time t and t+1. The framework 300 shown in FIGS. 3A and 3B effectively combines information from both camera images and LiDAR point clouds.

Semantic information from images (e.g., image 302) may assist in geometric reasoning and scene understanding. Overall, the GNN excels at capturing relationships and patterns in the BEV grid. The GNN may iteratively exchange information between neighboring points, allowing each point to learn from its local context. The scene flow vectors (direction and magnitude of movement) may be predicted by scene flow estimation module 208 for each point pair based on their fused attended embeddings, which may integrate semantic and geometric information. All components of the framework 300 shown in FIGS. 3A and 3B may be trained jointly, allowing for seamless optimization and adaptation to specific tasks.

Semantic information from images may enhance motion estimation in addition to scene understanding. CMAE module 206 may focus on relevant aspects of each modality, improving feature representation.

In an aspect, the GNN may capture local relationships and patterns in the point cloud effectively. Robust multimodal correspondence learning is advantageous at finding corresponding points across different modalities, important for accurate scene flow estimation. For example, such enhanced fusion may result in more accurate and reliable 3D motion estimation compared to previous approaches that may have relied on simpler fusion techniques or separate processing of each modality. Generally, the disclosed framework 300 may effectively combine semantic, geometric, and attention-based cues. For example, the disclosed framework 300 may leverage the power of graph neural networks for robust correspondence learning and motion estimation. The disclosed techniques may explicitly model cross-modal relationships for improved multi-sensor fusion. The disclosed framework 300 may be used in autonomous vehicles 102, where accurate scene flow is important for safe navigation and obstacle avoidance. In an aspect, the illustrated framework 300 may also be utilized in robotics, where understanding scene dynamics is important for intelligent interaction with environments.

In an aspect, the fused features may synergistically blend semantic information from images with geometric information from LiDAR point clouds. Semantic features may provide understanding of object identities and categories. Semantic features may also help distinguish relevant objects from background noise. Furthermore, semantic features may offer a higher-level interpretation of the scene. Geometric features may capture the precise 3D structure and layout of the scene. Geometric features may also encode the spatial relationships between points. Furthermore, geometric features may reveal local surface geometry and shapes. Knowing object identities and classes helps the machine learning system 204 in predicting their expected movements and interactions. In an aspect, precise 3D information may help resolve ambiguities in image-based semantic segmentation, especially in complex scenes or challenging lighting conditions.

The fused features may provide a richer and more comprehensive understanding of the scene, leading to more accurate predictions of object motions and scene dynamics. Semantic information may help bridge gaps in LiDAR data caused by occlusions or sensor limitations, and geometric context may help correct potential errors in semantic segmentation. The combined features enable a deeper understanding of the scene, including object relationships, spatial context, and underlying 3D structure.

Each point in the point cloud may be represented by a combination of semantic features and geometric features. Semantic features may capture the meaning or category of the point (e.g., "car," "person"). Geometric features may describe point's spatial properties (e.g., coordinates, normal vectors). Message passing in a GNN is a fundamental operation where nodes in a graph exchange information with their neighbors. Each node may be initialized with node's semantic and geometric features. In an aspect, nodes of the generated GNN may iteratively exchange information with their neighbors. Each node may send its features to one or more neighbors. Each node may receive features from one or more neighbors and may aggregate them using a specific function (e.g., update function described below). During aggregation, similarities in semantic embeddings may help identify points belonging to the same object instance, establishing correspondences. Geometric features may guide the aggregation process, focusing on features from likely spatial neighbors. Node features may be updated after each message passing round to incorporate information from the surrounding context. In an aspect, the updated features may reflect broader semantic and structural relationships, leading to richer point representations. Multi-modal feature propagation may enable the GNN to simultaneously consider semantic and geometric aspects, leading to better understanding of object relationships and structures in the point cloud. Points may gain information about their surroundings, enhancing their ability to represent complex shapes and scenes. Tasks like object detection, segmentation, and classification in point clouds may benefit from this multi-modal feature integration. Multi-modal feature propagation may identify and localize objects in 3D space. Point cloud segmentation may group points into meaningful segments (e.g., parts of objects). Machine learning system 204 may assign category labels to individual points.

Scene flow is the 3D motion field of individual points in a dynamic scene, capturing their movement between frames. In an aspect, identifying matching pairs of points in consecutive frames may be important for scene flow estimation module 208.

In an aspect, the GNN may incorporate both semantic (meaning-based) and geometric (spatial) features for each point. This fusion may provide a richer understanding of point relationships and object structures. When predicting scene flow vectors between point pairs, the GNN may leverage these fused representations.

In yet another aspect, points on the same moving object, even with local geometric changes, are likely to have similar semantic embeddings and coherent motion. The GNN may use this understanding to establish correspondences more accurately. In addition, through multiple message passing rounds, information may propagate across the graph, incorporating both local and global context. The GNN may jointly consider semantic and geometric cues, leading to a more robust understanding of the scene.

The fused representations and message passing may enable the GNN to learn point trajectories more accurately compared to using only raw sensor data without semantic understanding. GNNs offer a powerful framework for scene flow estimation by integrating semantic and geometric information. GNNs may model relationships between points effectively. GNNs may capture both local and global context.

Self-attention is a mechanism that allows different parts of an input sequence to interact with each other, learning long-range dependencies and contextual relationships. Transformer encoder blocks are building blocks of transformer models, consisting of self-attention layers and feed-forward neural networks. Point features ($f_p$) may be numerical representations of individual points in a point cloud, capturing their geometric and semantic properties. Pixel features ($f_i$) may be numerical representations of individual pixels in an image, capturing their color and texture information. In an aspect, CMAE module 206 may include one or more transformer encoder blocks.

In an aspect, point features ($f_p$) and pixel features ($f_i$) may be extracted from their respective input data using appropriate encoders (e.g., LiDAR point cloud encoder 207 for point clouds, image encoder 205 for images). Before projecting these features into a common space, transformer encoder blocks may be introduced for both point and pixel features. Each point feature ($f_p$) may attend to other points in the point cloud, learning relationships between them.

Point self-attention may be represented by Transformer $(f_p) \rightarrow f_{p'}$ (attended point feature). Each pixel feature ($f_i$) may attend to other pixels in the image, capturing spatial dependencies. Pixel self-attention may be represented by Transformer $(f_i) \rightarrow f_{i'}$ (attended pixel feature). The disclosed techniques may use the transformer encoder blocks to incorporate contextual information from neighboring points or pixels through self-attention.

The resulting attended feature vectors ($f_{p'}$ and $f_{i'}$) capture richer relationships within each modality. Self-attention may allow for modeling long-range relationships within point clouds or images, going beyond local neighborhoods. Features may become more context-aware, incorporating information from distant parts of the input to make more informed decisions. Self-attention has proven effective in various tasks involving point clouds and images, leading to better accuracy and robustness. Generally, point cloud processing may be used for 3D object detection, segmentation, classification, scene understanding. In an aspect, image processing may be used for image classification, object detection, segmentation, image generation.

Attended Features ($f_{p'}$, $f_{i'}$) may be feature vectors enriched with contextual information from self-attention within their respective encoders. Shared latent space may be a common representation space where features from different modalities (e.g., point clouds and images) may be directly compared and fused. Linear projection layers of the transformer may be neural network layers that transform features from one space to another, often used for dimensionality reduction or alignment.

In an aspect, CMAE module 206 may use equation (1) to project the attended point features ($f_{p'}$) into the shared latent space:

$$z_p = W_{pz} f_p' \tag{1}$$

where $W_{pz}$ is a linear projection matrix (weights) learned during training.

In an aspect, CMAE module 206 may use equation (2) to project the attended pixel features ($f_i'$) into the same shared latent space:

$$z_i = W_{pi} f_i' \tag{2}$$

where $W_{pi}$ is another linear projection matrix, specifically for pixel features. Each modality has its own projection layer to account for potential differences in feature distributions and dimensionality. Separate projection for modalities by the CMAE module 206 allows for modality-specific transformations while ensuring alignment in the shared space.

The projection matrices may reduce the dimensionality of the attended features to a common embedding dimension. In an aspect, dimensionality alignment performed by CMAE module 206 facilitates efficient comparison and fusion operations in the shared space. The projection process aligns features from different modalities, ensuring they represent compatible information in the shared space. Feature alignment performed by CMAE module 206 may enable subsequent layers (modules) to effectively combine and reason about features from both point clouds and images. Features from different modalities may directly interact and inform each other in the shared space. As a result, more meaningful and effective fusion of information from point clouds and images may be achieved.

Cross-attention mechanism allows features from one modality to attend to features from another modality, directly capturing their relationships.

In an aspect, a point embedding ($z_p$) may be a feature vector representing a point in the point cloud, projected into the shared latent space. A pixel embedding ($z_i$) may be a feature vector representing a pixel in the image, also projected into the shared latent space In an aspect, a softmax function is a function that normalizes a set of values into probabilities, ensuring they sum to 1.

In an aspect, attention weight ($\alpha_{ij}$) may be a scalar value representing the degree of correspondence between a specific point embedding $z_p$ and a specific pixel embedding $z_i$. Advantageously, CMAE module 206 may perform a projection of the pixel embedding. $z_i$ may be projected using the parameter matrix $W_{in}$, transforming $z_i$ into a suitable space for attending to point embeddings.

In an aspect, CMAE module 206 may then perform dot product calculation. CMAE module 206 may compute the dot product between the transposed point embedding $z_p^T$ and the projected pixel embedding $W_{in}z_i$. The dot product measures the similarity or alignment between the two embeddings.

In an aspect, CMAE module 206 may then perform softmax normalization. The softmax function may be applied to the dot product results to obtain normalized attention weights ($\alpha_{ij}$). In one implementation, the normalized attention weights may represent the relative importance of different point embeddings with respect to the specific pixel embedding $z_i$. Higher $\alpha_{ij}$ values may indicate stronger correspondence between the point and pixel, suggesting they likely represent the same or related entities in the scene. The attention weights may allow the CMAE module 206 to focus on point features that are most relevant to the current pixel, enhancing feature fusion and cross-modal understanding.

Attention weights 216 may guide the fusion process, ensuring that relevant and complementary information is effectively integrated.

Contrastive loss is a loss function designed to encourage similar data points to have close representations in a latent space, while pushing dissimilar points further apart. Attention weights ($\alpha_{ij}$) may represent the degree of correspondence between point and pixel embeddings, learned through cross-attention. Pairs of points and pixels that represent the same or related entities in the scene may be matched. CMAE module 206 may use the following equation (3) to calculate the contrastive loss (3):

$$L_{contrast} = -\log\left(\frac{\exp(\alpha i + j)}{\sum k \exp(\alpha ik)}\right) \tag{3}$$

The contrastive loss may minimize the loss by making the attention weight 216 for the true matching pixel-point pair ($\alpha_{i+j}$) significantly higher than the weights 216 for non-matching pairs.

Advantageously, the denominator of equation (3) normalizes the attention weights 216 for all pixel candidates, creating a probability-like distribution.

In an aspect, the numerator of equation (3) highlights the importance of the true matching pixel. The negative logarithm emphasizes the difference between the true match and other candidates, penalizing the model when the correct correspondence does not have a dominant attention weight.

In an aspect, correspondence-focused representations may guide CMAE module 206 to learn embeddings that effectively capture correspondences between points and pixels in the shared latent space. The attention-guided contrastive loss may enhance cross-modal understanding by ensuring that related features from different modalities are closely aligned in the latent space. The attention-guided contrastive loss may help the machine learning system 204 learn more discriminative representations, reducing the impact of noise and distractions.

Fusion attention is a mechanism that may selectively combine features from different modalities based on their relevance and importance. The attention weights 216 may be dynamically calculated based on the specific input features, enabling context-aware fusion. It should be noted that point features ($x_p$) may be numerical representations of individual points in the point cloud. Pixel features ($x_i$) may be numerical representations of individual pixels in the image. Fusion attention weights ($\beta_i$) may be scalar values that determine a degree of influence each modality has on the fused representation. In addition, projection matrix ($W_{fusion}$) may be a set of learnable parameters that map the concatenated features to attention weights 216.

In an aspect, CMAE module 206 may perform feature concatenation. Furthermore, CMAE module 206 may concatenate point features ($x_p$) and pixel features ($x_i$), creating a joint representation that captures information from both modalities. In an aspect, CMAE module 206 may next perform projection and attention weight calculations. The concatenated features may be projected using the fusion attention matrix ($W_{fusion}$). Such projection may produce the attention weights ($\beta_i$), which may dynamically adjust the influence of each modality based on the specific input. In an aspect, CMAE module 206 may perform weighted fusion.

It should be noted that input-dependent fusion attention may adapt the fusion process to the specific input, ensuring relevant information from each modality is emphasized. The input-dependent fusion attention may consider the content of the features themselves when determining how to combine them, leading to more meaningful fusion.

In general, input-dependent fusion attention may be applicable to any setting where information from multiple modalities needs to be fused, such as, but not limited to, natural language processing, speech recognition, and audio-visual understanding.

Attended embeddings may be feature vectors from point clouds ($f_p'$) and images ($z_i'$) that have been enriched with contextual information using self-attention and cross-attention. Fusion attention weights ($\beta_i$) may represent the relative importance to be assigned to the pixel embedding ($z_i'$) during fusion. Concatenation may be a simple but effective way to combine features from different modalities.

CMAE module 206 may perform weighting of pixel embedding. CMAE module 206 may multiply the pixel embedding ($z_i'$) by a corresponding fusion attention weight ($\beta_i$), emphasizing or attenuating its contribution based on context.

CMAE module 206 may perform concatenation with point embedding. The weighted pixel embedding may be concatenated with the point embedding ($f_p'$), creating a single, multi-modal representation (z*). Such fused representation may now incorporate information from both modalities, weighted according to their relevance. Input-dependent attention may ensure that relevant features from each modality are given more weight, leading to more meaningful and informative representation.

Machine learning system 204 may adjust the fusion process dynamically based on the input, making it robust to variations in data and tasks. The fused representation may capture relationships and correspondences between point cloud and image features, enabling better understanding of the scene.

In an aspect, z* may be fed into additional layers for more complex reasoning and decision-making. In the implementation illustrated in FIG. 3A, CMAE module 206 may provide z* to a GNN-based scene flow estimation model 208.

CMAE module 206 may learn representation for point clouds and images in a shared latent space, enabling direct interaction and comparison. Attention mechanisms play an important role in this process. Self-attention may capture long-range dependencies within each modality, enriching feature representations with contextual information. Fusion attention may dynamically combine attended embeddings based on input-specific relevance, ensuring context-aware fusion. The CMAE module 206 may learn to represent features in a way that emphasizes their relationships and correspondences, both within and across modalities. Attention mechanisms may make these relationships more explicit, providing a clearer understanding of how features from different modalities align and interact. The final fused embedding (z*) may encapsulate the relationships learned by the CMAE module 206, combining information from both point clouds and images in a meaningful way. Fused attended embedding may serve as a powerful input for various downstream tasks that require reasoning about both modalities, such as 3D object detection, semantic segmentation, and scene understanding. The joint embedding techniques with attention mechanisms may lead to a better understanding of how different modalities relate to each other, enhancing performance in multimodal tasks.

Input-dependent fusion attention may ensure that CMAE module 206 focuses on the most relevant information for each specific input, making it more versatile and adaptable. The attention-guided process may produce representations that are sensitive to the context of the input, leading to more accurate and robust predictions.

A multi-dimensional space may be a common ground where features from different modalities (e.g., point clouds, images) may be directly compared and combined. Shared representation may enable the CMAE module 206 to learn relationships and correspondences between features from different modalities, leading to a more holistic understanding. Features may become more context-aware, incorporating global information from their respective modality. Such cross-attention may facilitate the CMAE module's 206 ability to learn how features from different modalities relate to each other. However, using cross-attention, CMAE module 206 may also determine how much influence each modality has on the final fused representation, ensuring complementary information is integrated effectively. Features may be extracted from each modality using appropriate encoders (e.g., LiDAR point cloud encoder 207 for point clouds, image encoder 205 for images).

In summary, self-attention may be applied within each modality to encode contextual information. CMAE module 206 may apply cross-attention between features from different modalities in the shared space. CMAE module 206 may fuse the attended features, often using input-dependent attention weights, to create a unified representation. In an aspect, CMAE module 206 may learn to represent and relate features from different modalities in a coordinated way. The fused representations may capture both within-modality and cross-modality relationships, leading to better performance in downstream tasks.

For example, embedded multimodal data may align text with images or videos. CMAE module 206 may also combine audio and visual information.

As yet another non-limiting example, each modality (point cloud and image) may undergo self-attention, capturing intra-modality relationships.

Such projection may ensure efficient dimensionality reduction while preserving modality-specific details.

CMAE module 206 may calculate input-dependent fusion attention weights. Such attention weights may dynamically determine how much each modality contributes to the final fused representation, considering the specific input context. Higher attention weights for matching pixel-point pairs may signify stronger correspondences, encouraging CMAE module 206 to pull them closer. The contrastive loss may focus on maximizing the attention weight for the true matching pixel for each point, effectively emphasizing relevant correspondences during contrastive learning. Attention mechanisms may clearly highlight relationships between point and pixel features, leading to more precise and focused contrastive learning. The attention-guided techniques described herein may foster a deeper understanding of how different modalities connect and inform each other. By coupling self-attention, cross-attention, input-dependent fusion attention, and contrastive loss, CMAE module 206 may efficiently learn effective multi-modal representations focused on accurate correspondences. Such combination enables CMAE module 206 to excel in tasks requiring joint reasoning across point clouds and images. Self-attention may shine within each modality, highlighting important features and cross-attention may direct the spotlight between modalities, identifying potential links.

The resulting attended features may become more informative and context-aware, reflecting a deeper understanding of the relationships within each modality. The joint latent space may enable CMAE module 206 to learn correspondences and relationships between features from different modalities, leading to a more comprehensive understanding of the scene. CMAE module 206 may maintain modality-specific processing through separate encoders but may facilitate cross-modal understanding through the joint latent space.

In an aspect, cross-attention may enable CMAE module 206 to explicitly learn how features from different modalities relate to each other. Cross-attention may promote alignment and correspondence between features, capturing their interactions and dependencies. CMAE module 206 may enforce similarity between embeddings that represent corresponding entities in different modalities. In an aspect, contrastive learning may guide CMAE module 206 to focus on learning representations that capture correspondences, leading to better alignment and understanding of multi-modal relationships.

In an aspect, CMAE module 206 may dynamically determine how much influence each modality should have on the fused representation. In an aspect, CMAE module 206 may consider the specific input context, ensuring relevant information is emphasized for each task. Fusing with input-dependent attention weights may allow CMAE module 206 to adapt to different scenarios and focus on the most informative aspects of each modality. Cross-attention may enable explicit correspondence learning, unlike traditional fusion methods that often blend features without directly modeling their relationships. Advantageously, CMAE module 206 may provide learning representations that effectively capture relationships between different modalities. CMAE module 206 may also facilitate machine learning system 204 to understand how features from different modalities align and interact.

As noted above, the GNN structure may be generated by scene flow estimation module 208 and may capture the geometric relationships between points. Each node in the graph, denoted as v, may correspond to a single 3D point in the point cloud. Edges may connect nodes that are considered neighbors based on their spatial proximity. In an aspect, an edge (vi, vj) exists between nodes vi and vj if they are within a specified distance threshold, forming a local neighborhood. A 3D coordinate vector ($x_v$) may encode the precise location of the point in 3D space. In an aspect, the scene flow estimation module 208 may receive from the CMAE module 206 a fused feature vector ($f_v$) that may contain rich semantic and geometric information about a corresponding point. In other words, the scene flow estimation module 208 may receive from the CMAE module 206 a point cloud representing the 3D scene. Edges may be established between nodes that are spatially close in the point cloud. The scene flow estimation module 208 may create a network of interconnected points, reflecting the geometric structure of the scene. In an aspect, scene flow estimation module 208 may assign each node a corresponding 3D coordinate vector and fused feature vector, providing both geometric and semantic context for the GNN to work with. The GNN may aggregate information from a node's neighbors and its own features to create richer, context-aware representations of each point. Feature refinement process may refine the fused features and incorporate information about local geometric relationships, leading to improved scene flow estimation. Advantageously, the described graph representation effectively captures spatial relationships and patterns within the point cloud. As yet another advantage, graph representation also preserves the 3D structure of the scene in a way that traditional deep learning models, designed for grid-like data, might not.

In an aspect, the GNN may iteratively exchange information between nodes that are connected in the graph using a message function. The message function determines what information is sent from one node to another. Message function may receive the following input: 3D coordinate vector of node v ($x_v$) (geometric information), fused feature vector of node v ($f_v$) (semantic and geometric features), 3D coordinate vector of the neighboring node v' ($x_{v'}$), and fused feature vector of the neighboring node v' (fv'). The message function may combine these features into a single input vector, capturing both local geometric relationships and semantic context. In one implementation, scene flow estimation module 208 may employ Multi-Layer Perceptron (MLP) for processing GNN information. The MLP may be a small neural network that takes this concatenated vector as input. The MLP may learn complex relationships between features. The MLP may transform the features into a meaningful message vector. In an aspect, MLP's output may be the message $m_{v \rightarrow v'}$ encoding relevant information to be passed from node v to its neighbor v'. Message function may create messages that are specifically relevant for neighboring nodes, considering their individual features and relationships. Advantageously, message function ensures that message passing effectively captures local geometric and semantic patterns within the point cloud. The GNN may gather messages from multiple neighbors for each node.

In an aspect, scene flow estimation module 208 nay combine one or more exchanged messages with the node's own features using an update function. In an aspect, scene flow estimation module 208 may update each node's feature vector based on information gathered from its neighbors, enabling each node to learn from its local context. Scene flow estimation module 208 may sum up messages ($m_{v \rightarrow v'}$) received from all neighboring nodes ($v' \in N(v)$). In an aspect, scene flow estimation module 208 may combine the received messages into a single, aggregated message vector representing collective insights from the neighborhood. In an aspect, scene flow estimation module 208 may concatenate the aggregated message vector with the node's current feature vector ($h_v$). Scene flow estimation module 208 may pass this combined input through another MLP ($W_{upd}$). The MLP may learn how to effectively integrate information from neighboring nodes and the node's own features. In an aspect, scene flow estimation module 208 may apply a non-linear activation function ($\sigma$), such as ReLU, to the output of the MLP. The non-linear activation function introduces non-linearity, enabling the scene flow estimation module 208 to model complex relationships and patterns within the data. The final output of the MLP, after the non-linearity, may be the updated feature vector ($h_v$) for the node.

Figure 4:
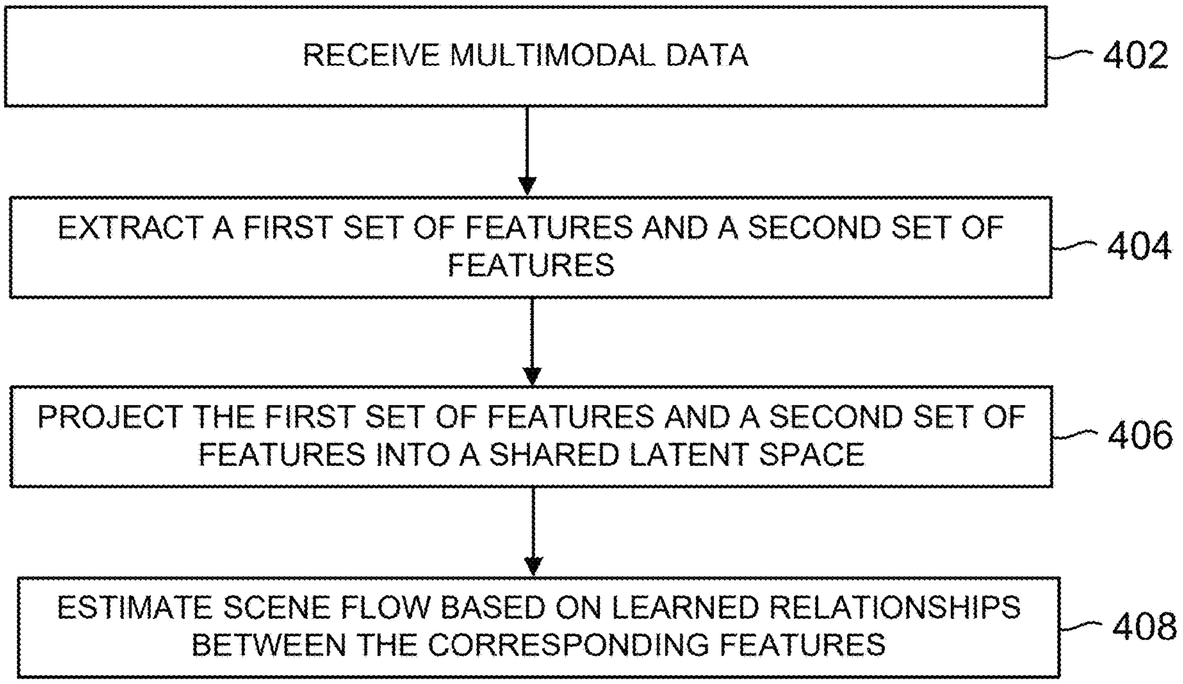
FIG. 4 is a flowchart illustrating an example method for performing semantic guided scene flow estimation in accordance with the techniques of this disclosure.

FIG. 4 is a flowchart illustrating an example method for performing semantic guided scene flow estimation in accordance with the techniques of this disclosure. Although described with respect to computing system 200 (FIG. 2), it should be understood that other devices may be configured to perform a method similar to that of FIG. 4.

In this example, machine learning system 204 may initially receive multimodal data having at least a first modality and a second modality (402). The multimodal data may represent a plurality of points in a scene. The machine learning system 204 may extract a first set of features from the first modality and may extract a second set of features from the second modality (404). In an aspect, LiDAR point cloud encoder 207 may extract geometric features that describe the 3D structure of the scene. In an aspect, image encoder 205 may extract visual features that capture object appearances and textures. Next, the machine learning system 204 may project the first set of features and the second set of features into a shared latent space to generate first latent representation of the first set of features and second latent representation of the second set of features (406). In an aspect, CMAE module 206 may use equation (1) to project the attended point features (fp') into the shared latent space:

$$zp = Wpz\, fp' \tag{1}$$

where Wpz is a linear projection matrix (weights) learned during training. In an aspect, CMAE module 206 may use equation (2) to project the attended pixel features (fi') into the same shared latent space:

$$zi = Wpi\, fi' \tag{2}$$

where Wpi is another linear projection matrix, specifically for pixel features. Next, machine learning system 204 may estimate a flow of the plurality of points of the scene based on the learned one or more relationships between the first set of features and the second set of features by using a model trained to learn the one or more relationships between the first set of features and the second set of features based on the first latent representation and the second latent representation (408). For example, cross-attention mechanism allows features from one modality to attend to features from another modality, directly capturing their relationships. Semantic information from images may guide geometric reasoning and point flow prediction.

The following numbered clauses illustrate one or more aspects of the devices and techniques described in this disclosure.

Clause 1. A method for scene flow estimation includes receiving multimodal data having at least a first modality and a second modality, wherein the multimodal data represents a plurality of points in a scene; and extracting a first set of features from the first modality and extracting a second set of features from the second modality. The method also includes projecting the first set of features and the second set of features into a shared latent space to generate a first latent representation of the first set of features and a second latent representation of the second set of features. The method further includes estimating flow of the plurality of points of the scene based on one or more relationships between the first set of features and the second set of features by using a model trained to learn the one or more relationships between the first set of features and the second set of features based on the first latent representation and the second latent representation.

Clause 2—The method of clause 1, further comprising: defining a surface of each object depicted in the scene using a local coordinate system corresponding to each object.

Clause 3—The method of clause 1, wherein the first modality comprises image data and the second modality comprises LiDAR point cloud data, wherein extracting the first set of features from the first modality comprises extracting one or more semantic priors providing semantic information about the scene and wherein extracting the second set of features from the second modality comprises extracting geometric features capturing a 3D structure and layout of the scene.

Clause 4—The method of clause 3, further comprising training the model to learn the one or more relationships between the first set of features and the second set of features based on the first latent representation and the second latent representation, wherein learning the one or more relationships between the first set of features and the second set of features comprises integrating the extracted semantic information with the extracted geometric features to generate an integrated representation.

Clause 5—The method of clause 4, wherein estimating the flow of the plurality of points of the scene comprises using the extracted semantic information to guide geometric reasoning and point flow predictions.

Clause 6—The method of clause 4, wherein integrating the extracted semantic information with the extracted geometric features further comprises generating a plurality of fused multi-modal features that combine the semantic information and the geometric features.

Clause 7—The method of clause 4, wherein integrating the extracted semantic information with the extracted geometric features further comprises concatenating the extracted semantic information with the extracted geometric features using cross-modal attention.

Clause 8—The method of clause 7, wherein integrating the extracted semantic information with the extracted geometric features using cross-modal attention further comprises integrating the extracted semantic information with the extracted geometric features using one or more attention weights comprising scalar values indicating a degree of influence the extracted semantic information and the extracted geometric features have on the integrated representation.

Clause 9—The method of clause 4, wherein estimating the flow of the plurality of points of the scene comprises generating a Graph Neural Network (GNN) having a plurality of nodes and a plurality of edges interconnecting the plurality of nodes, wherein each of the plurality of nodes represents the semantic information and the geometric features associated with each of the plurality of points, wherein neighboring nodes of the GNN exchange the semantic information and the geometric features and wherein each of the plurality of nodes aggregates, using an update function, the semantic information and the geometric features associated with a corresponding node with the semantic information and the geometric features received from the neighboring nodes.

Clause 10—The method of clause 9, wherein a first node of the plurality of nodes representing a first point of the plurality of points is connected by one of the plurality of edges to a second node of the plurality of nodes representing a second point of the plurality of points if a distance between the first point and the second point is less than a predefined threshold.

Clause 11—The method of clause 9, wherein the scene flow estimation is used to determine velocity of an object associated with a 3D scene.

Clause 12—The method of clause 1, further comprising operating an Advanced Driver Assistance Systems (ADAS) system based on an estimation of the flow of the plurality of points of the scene.

Clause 13. An apparatus for scene flow estimation, the apparatus comprising: a memory for storing multimodal data; and processing circuitry in communication with the memory, wherein the processing circuitry is configured to: receive the multimodal data having at least a first modality and a second modality, wherein the multimodal data represents a plurality of points in a scene; extract a first set of features from the first modality and extract a second set of features from the second modality; project the first set of features and the second set of features into a shared latent space to generate a first latent representation of the first set of features and a second latent representation of the second set of features; and estimate a flow of the plurality of points of the scene based on one or more relationships between the first set of features and the second set of features by using a model trained to learn the one or more relationships between the first set of features and the second set of features based on the first latent representation and the second latent representation.

Clause 14—The apparatus of clause 13, wherein the processing circuitry is further configured to: define a surface of each object depicted in the scene using a local coordinate system corresponding to each object.

Clause 15—The apparatus of clause 13, wherein the first modality comprises image data and the second modality comprises LiDAR point cloud data, wherein the processing circuitry configured to extract the first set of features from the first modality is further configured to extract one or more semantic priors providing semantic information about the scene and wherein the processing circuitry configured to extract the second set of features from the second modality is further configured to extract geometric features capturing a 3D structure and layout of the scene.

Clause 16—The apparatus of clause 15, wherein the processing circuitry is further configured to: train the model to learn the one or more relationships between the first set of features and the second set of features based on the first latent representation and the second latent representation, and wherein the model configured to learn the one or more relationships between the first set of features and the second set of features is further configured to integrate the extracted semantic information with the extracted geometric features to generate an integrated representation.

Clause 17—The apparatus of clause 16, wherein the processing circuitry configured to estimate the flow of the plurality of points of the scene is further configured to use the extracted semantic information to guide geometric reasoning and point flow predictions.

Clause 18—The apparatus of clause 16, wherein the processing circuitry configured to integrate the extracted semantic information with the extracted geometric features is further configured to generate a plurality of fused multimodal features that combine the semantic information and the geometric features.

Clause 19—The apparatus of clause 16, wherein the processing circuitry configured to integrate the extracted semantic information with the extracted geometric features is further configured to concatenate the extracted semantic information with the extracted geometric features using cross-modal attention.

Clause 20—The apparatus of clause 19, wherein the processing circuitry configured to integrate the extracted semantic information with the extracted geometric features using cross-modal attention is further configured to integrate the extracted semantic information with the extracted geometric features using one or more attention weights comprising scalar values indicating a degree of influence the extracted semantic information and the extracted geometric features have on the integrated representation.

Clause 21—The apparatus of clause 16, wherein the processing circuitry configured to estimate the flow of the plurality of points of the scene is further configured to generate a Graph Neural Network (GNN) having a plurality of nodes and a plurality of edges interconnecting the plurality of nodes, wherein each of the plurality of nodes represents the semantic information and the geometric features associated with each of the plurality of points, wherein neighboring nodes of the GNN exchange the semantic information and the geometric features and wherein each of the plurality of nodes aggregates, using an update function, the semantic information and the geometric features associated with a corresponding node with the semantic information and the geometric features received from the neighboring nodes.

Clause 22—The apparatus of clause 21, wherein a first node of the plurality of nodes representing a first point of the plurality of points is connected by one of the plurality of edges to a second node of the plurality of nodes representing a second point of the plurality of points if a distance between the first point and the second point is less than a predefined threshold.

Clause 23—The apparatus of clause 21, wherein the scene flow estimation is used to determine velocity of an object associated with a 3D scene.

Clause 24—The apparatus of clause 13, wherein the processing circuitry is further configured to operate an Advanced Driver Assistance Systems (ADAS) system based on an estimation of the flow of the plurality of points of the scene.

Clause 25—A computer-readable medium storing instructions that, when applied by processing circuitry, causes the processing circuitry to: receive the multimodal data having at least a first modality and a second modality, wherein the multimodal data represents a plurality of points in a scene; extract a first set of features from the first modality and extract a second set of features from the second modality; project the first set of features and the second set of features into a shared latent space to generate a first latent representation of the first set of features and a second latent representation of the second set of features; and estimate a flow of the plurality of points of the scene based on one or more relationships between the first set of features and the second set of features by using a model trained to learn the one or more relationships between the first set of features and the second set of features based on the first latent representation and the second latent representation.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for scene flow estimation comprising:

receiving multimodal data having at least a first modality and a second modality, wherein the multimodal data represents a plurality of points in a scene;

extracting a first set of features from the first modality and extracting a second set of features from the second modality;

projecting the first set of features and the second set of features into a shared latent space to generate a first latent representation of the first set of features and a second latent representation of the second set of features; and estimating a flow of the plurality of points of the scene based on one or more relationships between the first set of features and the second set of features comprising using a model configured to represent the one or more relationships between the first set of features and the second set of features based on the first latent representation and the second latent representation, wherein the model is configured to integrate the first set of features with the second set of features to generate an integrated representation by concatenating the first set of features with the second set of features using cross-modal attention and using one or more attention weights comprising scalar values indicating a degree of influence the first set of features and the second set of features have on the integrated representation.

2. The method of claim 1, further comprising:

defining a surface of each object depicted in the scene using a local coordinate system corresponding to each object.

3. The method of claim 1, wherein the first modality comprises image data and the second modality comprises LiDAR point cloud data, wherein extracting the first set of features from the first modality comprises extracting one or more semantic priors providing semantic information about the scene and wherein extracting the second set of features from the second modality comprises extracting geometric features capturing a 3D structure and layout of the scene.

4. The method of claim 3, further comprising:

training the model to learn the one or more relationships between the first set of features and the second set of features based on the first latent representation and the second latent representation, wherein learning the one or more relationships between the first set of features and the second set of features comprises integrating the extracted semantic information with the extracted geometric features to generate the integrated representation.

5. The method of claim 4, wherein estimating the flow of the plurality of points of the scene comprises using the extracted semantic information to guide geometric reasoning and point flow predictions.

6. The method of claim 4, wherein integrating the extracted semantic information with the extracted geometric features further comprises generating a plurality of fused multi-modal features that combine the semantic information and the geometric features.

7. The method of claim 1, wherein estimating the flow of the plurality of points of the scene comprises generating a Graph Neural Network (GNN) having a plurality of nodes and a plurality of edges interconnecting the plurality of nodes, wherein each of the plurality of nodes represents the semantic information and the geometric features associated with each of the plurality of points, wherein neighboring nodes of the GNN exchange the semantic information and the geometric features and wherein each of the plurality of nodes aggregates, using an update function, the semantic information and the geometric features associated with a corresponding node with the semantic information and the geometric features received from the neighboring nodes.

8. The method of claim 7, wherein a first node of the plurality of nodes representing a first point of the plurality of points is connected by one of the plurality of edges to a second node of the plurality of nodes representing a second point of the plurality of points if a distance between the first point and the second point is less than a predefined threshold.

9. The method of claim 7, wherein the scene flow estimation is used to determine velocity of an object associated with a 3D scene.

10. The method of claim 1, further comprising operating an Advanced Driver Assistance Systems (ADAS) system based on an estimation of the flow of the plurality of points of the scene.

11. An apparatus for scene flow estimation, the apparatus comprising:

a memory for storing multimodal data; and processing circuitry in communication with the memory, wherein the processing circuitry is configured to:

receive the multimodal data having at least a first modality and a second modality, wherein the multimodal data represents a plurality of points in a scene;

extract a first set of features from the first modality and extract a second set of features from the second modality;

project the first set of features and the second set of features into a shared latent space to generate a first latent representation of the first set of features and a second latent representation of the second set of features; and estimate a flow of the plurality of points of the scene based on one or more relationships between the first set of features and the second set of features by using a model configured to represent the one or more relationships between the first set of features and the second set of features based on the first latent representation and the second latent representation, wherein the model is configured to integrate the first set of features with the second set of features to generate an integrated representation by concatenating the first set of features with the second set of features using cross-modal attention and using one or more attention weights comprising scalar values indicating a degree of influence the first set of features and the second set of features have on the integrated representation.

12. The apparatus of claim 11, wherein the processing circuitry is further configured to:

define a surface of each object depicted in the scene using a local coordinate system corresponding to each object.

13. The apparatus of claim 11, wherein the first modality comprises image data and the second modality comprises LiDAR point cloud data, wherein the processing circuitry configured to extract the first set of features from the first modality is further configured to extract one or more semantic priors providing semantic information about the scene and wherein the processing circuitry configured to extract the second set of features from the second modality is further configured to extract geometric features capturing a 3D structure and layout of the scene.

14. The apparatus of claim 13, wherein the processing circuitry is further configured to:

train the model to learn the one or more relationships between the first set of features and the second set of features based on the first latent representation and the second latent representation, and wherein the model configured to learn the one or more relationships between the first set of features and the second set of features is further configured to integrate the extracted semantic information with the extracted geometric features to generate the integrated representation.

15. The apparatus of claim 14, wherein the processing circuitry configured to estimate the flow of the plurality of points of the scene is further configured to use the extracted semantic information to guide geometric reasoning and point flow predictions.

16. The apparatus of claim 14, wherein the processing circuitry configured to integrate the extracted semantic information with the extracted geometric features is further configured to generate a plurality of fused multi-modal features that combine the semantic information and the geometric features.

17. The apparatus of claim 11, wherein the processing circuitry configured to estimate the flow of the plurality of points of the scene is further configured to generate a Graph Neural Network (GNN) having a plurality of nodes and a plurality of edges interconnecting the plurality of nodes, wherein each of the plurality of nodes represents the semantic information and the geometric features associated with each of the plurality of points, wherein neighboring nodes of the GNN exchange the semantic information and the geometric features and wherein each of the plurality of nodes aggregates, using an update function, the semantic information and the geometric features associated with a corresponding node with the semantic information and the geometric features received from the neighboring nodes.

18. The apparatus of claim 17, wherein a first node of the plurality of nodes representing a first point of the plurality of points is connected by one of the plurality of edges to a second node of the plurality of nodes representing a second point of the plurality of points if a distance between the first point and the second point is less than a predefined threshold.

19. The apparatus of claim 17, wherein the scene flow estimation is used to determine velocity of an object associated with a 3D scene.

20. The apparatus of claim 11, wherein the processing circuitry is further configured to operate an Advanced Driver Assistance Systems (ADAS) system based on an estimation of the flow of the plurality of points of the scene.

21. A non-transitory computer-readable medium storing instructions that, when applied by processing circuitry, causes the processing circuitry to:

receive the multimodal data having at least a first modality and a second modality, wherein the multimodal data represents a plurality of points in a scene;

extract a first set of features from the first modality and extract a second set of features from the second modality;

project the first set of features and the second set of features into a shared latent space to generate a first latent representation of the first set of features and a second latent representation of the second set of features; and estimate a flow of the plurality of points of the scene based on the one or more relationships between the first set of features and the second set of features by using a model configured to represent the one or more relationships between the first set of features and the second set of features based on the first latent representation and the second latent representation, wherein the model is configured to integrate the first set of features with the second set of features to generate an integrated representation by concatenating the first set of features with the second set of features using cross-modal attention and using one or more attention weights comprising scalar values indicating a degree of influence the first set of features and the second set of features have on the integrated representation.

* * * * *